(12) United States Patent
LaSusa

(10) Patent No.: US 6,678,934 B1
(45) Date of Patent: Jan. 20, 2004

(54) METHOD AND PROCESS OF A UNIVERSAL WINDOW SYSTEM USING SINGULAR ADVANCED COMPONENTS OF A POLYMER BASED OR METALLURGY BASED PRODUCT

(76) Inventor: Frank LaSusa, 674 N. 1300 W., Clinton, UT (US) 84015

( * ) Notice: Subject to any disclaimer, the term of this patent is extended or adjusted under 35 U.S.C. 154(b) by 0 days.

(21) Appl. No.: 09/679,220

(22) Filed: Oct. 3, 2000

Related U.S. Application Data

(60) Provisional application No. 60/157,625, filed on Oct. 4, 1999.

(51) Int. Cl.$^7$ ............................................. B23P 25/00
(52) U.S. Cl. ........................ 29/458; 29/897; 29/897.3
(58) Field of Search ...................... 29/458, 897, 897.3; 52/656.5, 658, 786.13

(56) References Cited

U.S. PATENT DOCUMENTS

| | | | | |
|---|---|---|---|---|
| 2,037,611 A | * | 4/1936 | Antrim .......................... | 52/568 |
| 2,047,835 A | * | 7/1936 | Prew ............................ | 294/172 |
| 2,126,544 A | * | 8/1938 | Everhard ...................... | 52/658 |
| 2,219,594 A | * | 10/1940 | Lang ............................ | 49/504 |
| 2,781,111 A | * | 2/1957 | Kunkel ......................... | 49/434 |
| 2,952,342 A | * | 9/1960 | Schnittker .................... | 52/658 |
| 3,074,772 A | * | 1/1963 | Kessler et al. ............... | 312/204 |
| 3,087,207 A | * | 4/1963 | Styra ........................... | 52/309.1 |
| 3,287,041 A | * | 11/1966 | Cohen .......................... | 52/658 |
| 3,305,998 A | * | 2/1967 | Deisenroth .................. | 52/656.6 |
| 3,315,431 A | * | 4/1967 | Yake ............................ | 52/800.12 |
| 3,327,766 A | * | 6/1967 | Kurz ............................ | 160/381 |
| 3,348,353 A | * | 10/1967 | Cartagena ................... | 52/658 |
| 3,376,670 A | * | 4/1968 | Jones .......................... | 49/501 |
| 3,484,126 A | * | 12/1969 | Hook ........................... | 52/658 |
| 3,802,105 A | * | 4/1974 | Bendix ......................... | 40/785 |
| 3,854,248 A | * | 12/1974 | Dayus .......................... | 49/504 |
| 4,269,255 A | * | 5/1981 | Nailor et al. ................. | 160/381 |
| 4,327,142 A | | 4/1982 | Norzi ........................... | 428/198 |
| 4,407,100 A | | 10/1983 | Huelsekopf .................. | 52/212 |
| 4,460,737 A | | 7/1984 | Evans et al. ................. | 524/584 |
| 4,574,553 A | * | 3/1986 | Lisec ........................... | 52/658 |
| 4,597,232 A | * | 7/1986 | Lingemann ................... | 52/304 |
| 4,941,288 A | * | 7/1990 | Morton ........................ | 49/504 |
| 5,155,956 A | | 10/1992 | Norment et al. .............. | 52/217 |
| 5,189,841 A | * | 3/1993 | Arbetter ....................... | 49/504 |
| 5,491,940 A | | 2/1996 | Bruchu ......................... | 52/213 |
| 5,540,019 A | | 7/1996 | Beske et al. ................. | 52/204.5 |
| 5,555,684 A | | 9/1996 | Galowitz et al. ............. | 52/204.5 |
| 5,585,155 A | | 12/1996 | Heikkila et al. ............. | 428/36.7 |
| 5,603,585 A | | 2/1997 | Bruchu et al. ............... | 403/382 |
| 5,620,648 A | | 4/1997 | Volkmann et al. .......... | 264/511 |
| 5,622,017 A | | 4/1997 | Lynn et al. ................... | 52/209 |
| 5,799,453 A | | 9/1998 | Westerlund .................. | 52/259 |
| 5,901,509 A | * | 5/1999 | Rose ............................ | 52/209 |
| 6,047,514 A | * | 4/2000 | Verch .......................... | 52/656.5 |
| 6,073,412 A | * | 6/2000 | Verch .......................... | 52/656.5 |

FOREIGN PATENT DOCUMENTS

JP           402127492    *   5/1990   ............ F16J/15/10

* cited by examiner

*Primary Examiner*—Gregory Vidovich
*Assistant Examiner*—Essama Omgba
(74) *Attorney, Agent, or Firm*—Lloyd W. Sadler

(57) ABSTRACT

A method for producing window components using polymer based, metallurgy based, extruded, injection molded, or wood material is provided. This invention provides a low cost, highly reliable, low defect method of producing window components by machining from a singular piece of material, providing bendable portions, with angled portions adapted to fit together to define a wide range of window shapes and sizes.

16 Claims, 4 Drawing Sheets

US 6,678,934 B1

METHOD AND PROCESS OF A UNIVERSAL WINDOW SYSTEM USING SINGULAR ADVANCED COMPONENTS OF A POLYMER BASED OR METALLURGY BASED PRODUCT

This application is based on Provisional Patent Application Serial No. 60/157,625, which was filed on Oct. 4, 1999, and priority is claimed thereto.

BACKGROUND OF THE INVENTION

1. Field of the Invention

This invention relates to the manufacture of window systems. More specifically, this invention relates to the manufacture of window systems using polymer based or metallurgy based component parts.

2. Description of Related Art

A variety of methods and process for the construction of window system assemblies have been proposed. Typically, these prior methods and processes require costly, complex, inconsistent, error and waste prone, susceptible to defects manufacturing steps. Generally, these prior methods and processes require a large number of pieces of equipment and skilled craftsmen. For general background, the reader is directed to the following United States Patent Nos., each of which is hereby incorporated by reference in its entirety for the material contained therein: U.S. Pat. Nos. 4,327,142, 4,407,100, 4,460,737, 5,155,956, 5,491,940, 5,540,019, 5,555,684, 5,585,155, 5,603,585, 5,620,648, 5,622,017, and 5,799,453. The reference to this related U.S. Patent documents is not an admission of prior art, as the inventor's date of invention may predate the date of filing and/or publication of these references.

SUMMARY OF THE INVENTION

It is desirable to provide a method and process of the manufacture window systems, which makes use of singular advanced components of a polymer based or metallurgy based window system, that minimizes complexity, cost, product inconsistencies, defects, while producing a universal window system using largely automated procedures and advanced materials.

Therefore, it is a general object of this invention to provide a method and process for the construction of universal window systems, using advanced components of a polymer based or a metallurgy based product.

It is a further object of this invention to provide a method and process for the construction of universal window systems that reduces labor costs.

It is a still further object of this invention to provide a method and process for the construction of universal window systems that reduces the defects of the window system products.

Another object of this invention is to provide a method and process for the construction of universal window systems that makes use of automation techniques to improve product quality.

A further object of this invention is to provide a method and process for the construction of universal window systems that produces window components in a singular form.

A still further object of this invention is to provide a method and process for the construction of universal window systems that works with extruded, injected, or other composite derived materials.

These and other objects of this invention will be readily apparent to those or ordinary skill in the art upon review of the following drawings, detailed description and claims. In the preferred embodiment of this invention, the method and process of this invention are described as follows.

BRIEF DESCRIPTION OF THE DRAWINGS

In order to show the manner that the above recited and other advantages and objects of the invention are obtained, a more particular description of the preferred embodiment of this invention, which is illustrated in the appended drawings, is described as follows. The reader should understand that the drawings depict only a present preferred and best mode embodiment of this invention, and are not to be considered as limiting in scope. A brief description of the drawings is as follows.

Reference will now be made in detail to the present preferred embodiment of the invention, examples of which are illustrated in the accompanying drawings.

DETAILED DESCRIPTION OF THE INVENTION

Figure 1A:
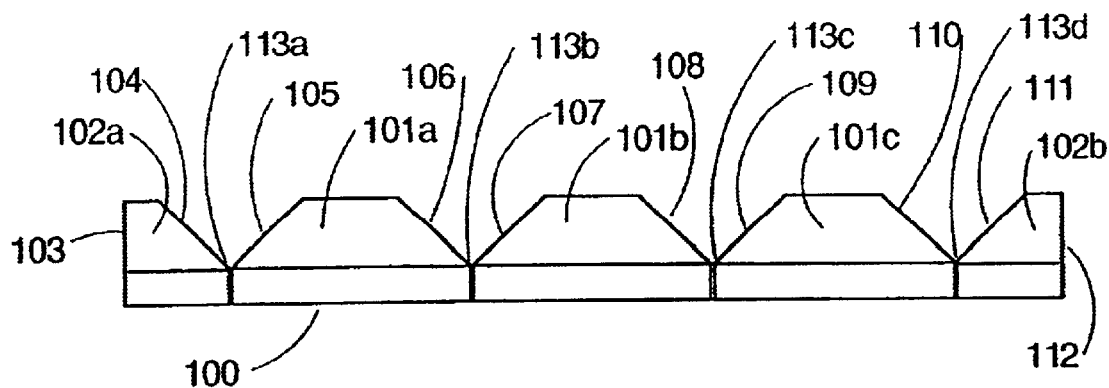
FIG. 1a is a window component profile, manufactured using the process of this invention.
Figure 3A:
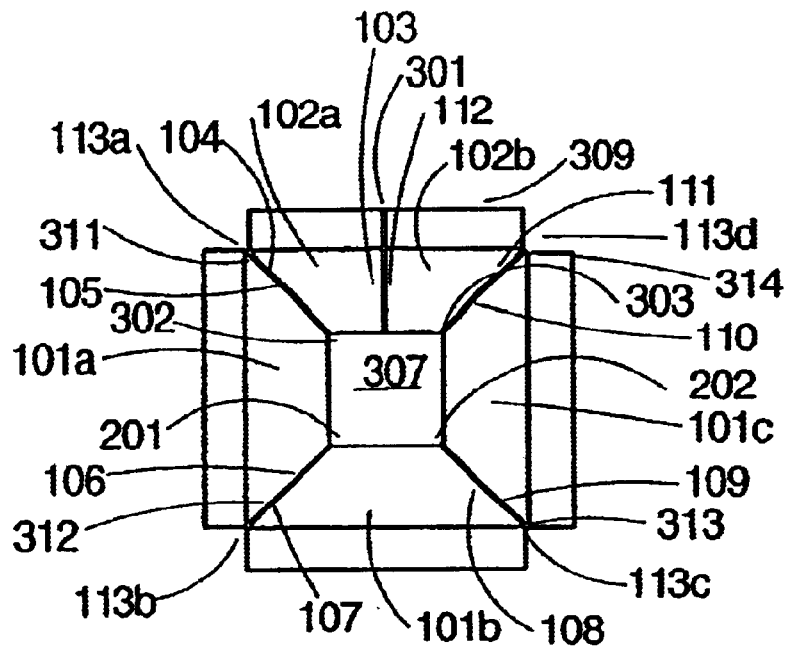
FIG. 3a is a completed window component in the final stage ready for installation.

FIG. 1a shows a window component profile, manufactured using the process of this invention. This preferred embodiment of the window component has three generally elongate sections 101a, 101b, 101c and two half sections 102a, 102b, each connected 113a, 113b, 113c, 113d to an adjacent section. In alternative embodiments, when it is desired to have windows with non-rectangular shapes, the number of sections can be increased or reduced. For example, a triangular shaped window may have only two long sections and two half sections. In another example, an octagonal shaped window may have seven long sections and two half sections. The connections 113a, 113b, 113c, 113d are flexible permitting a bend at the connection 113a, 113b, 113c, 113d. The preferred elongate sections 101a, 101b, 101c and half sections 102a, 102b are preferably made of a composite material, molded, cut, milled, routed or otherwise shaped in to the desired generally decorative shape. While the sections 101a, 101b, 101c are shown, in this embodiment, as being of generally the same length, in alternative embodiments, the sections 101a, 101b, 101c may have different lengths as appropriate to the desired window shape. Each section 101a, 101b, 101c is provided with two diagonal cut sloped portions (respectively 105, 106; 107, 108; and 109, 110). These diagonal cut sloped portions 105, 106, 107, 108, 109, 110 are shown having an angle of 45 degrees, however, in alternative embodiments this angle may be either increased or decreased as necessary in order to facilitate the joining of two adjacent diagonal sloped portions, to thereby produce a window component having the desired shape. The ends 103 and 112 are, in this embodiment, at approximately 90 degrees from the base 100 of the window portions, thereby facilitating the joining of the ends 103, 112, as shown in FIG. 3a.

Figure 1B:
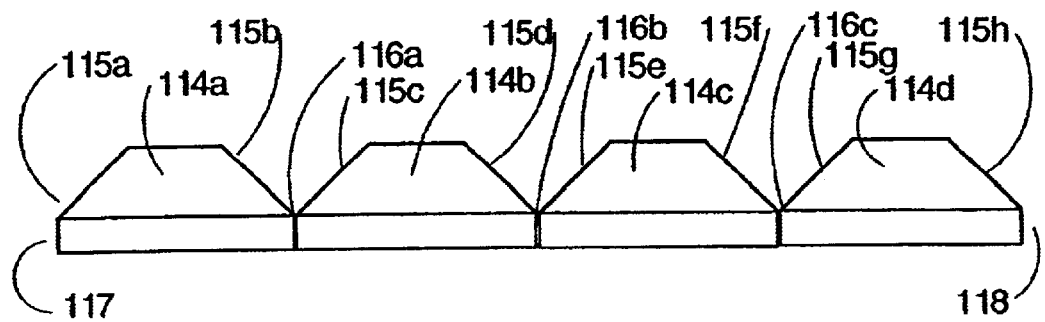
FIG. 1b is an alternative window component profile, manufactured using the process of this invention.
Figure 3B:
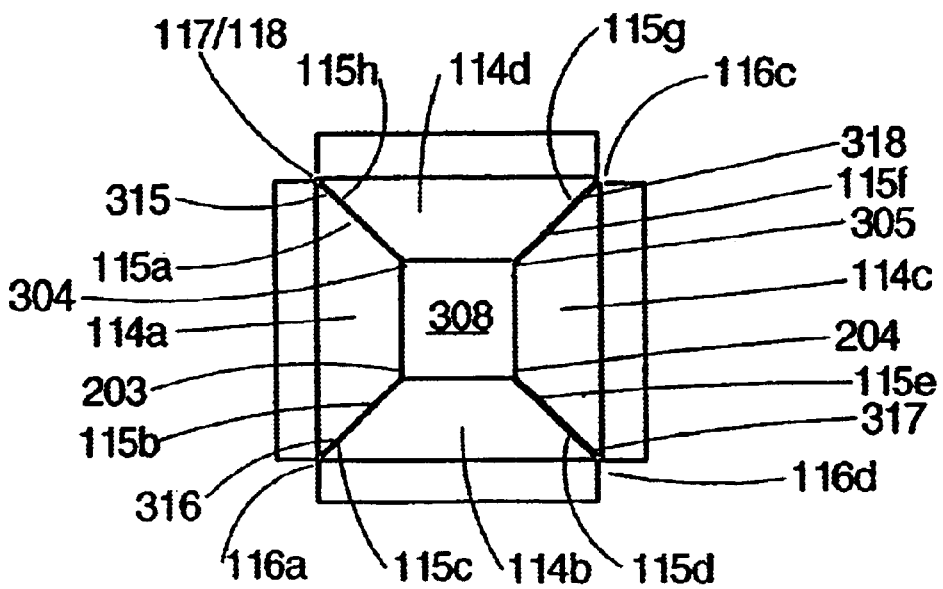
FIG. 3b is an alternative completed window component in the final stage ready for installation.

FIG. 1b shows an alternative window component profile, manufactured using the process of this invention. This second preferred embodiment of the window component has four generally elongate sections 114a, 114b, 114c, 114d each connected 116a, 116b, 116c to an adjacent section. In alternative embodiments, when it is desired to have windows with non-rectangular shapes, the number of sections can be increased or reduced. For example, a triangular shaped window may have only three long sections. In another example, an octagonal shaped window may have eight long sections. The connections 116a, 116b, 116c are flexible permitting a bend at the connection 116a, 116b, 116c. The preferred elongate sections 114a, 114b, 114c, 114d are preferably made of a composite material, molded, cut, milled, routed or otherwise shaped in to the desired generally decorative shape. While the sections 114a, 114b, 114c, 114d are shown, in this embodiment, as being of generally the same length, in alternative embodiments the sections 114a, 114b, 114c, 114d may have different lengths, as appropriate for the desired window shape. Each section 114a, 114b, 114c, 114d is provided with two diagonal cut sloped portions (respectively 115a, 115b; 115c, 115d; 115e, 115f; 115g, 115h). These diagonal cut sloped portions 115a, 115b, 115c, 115d, 115e, 115f, 115g, 115h are shown having an angle of 45 degrees, however, in alternative embodiments this angle may be either increased or decreased as necessary in order to facilitate the joining of two adjacent diagonal sloped portions, to thereby produce a window component having the desired shape. The joining of the ends 117, 118 are as shown in FIG. 3b to form the complete window component.

Figure 2A:
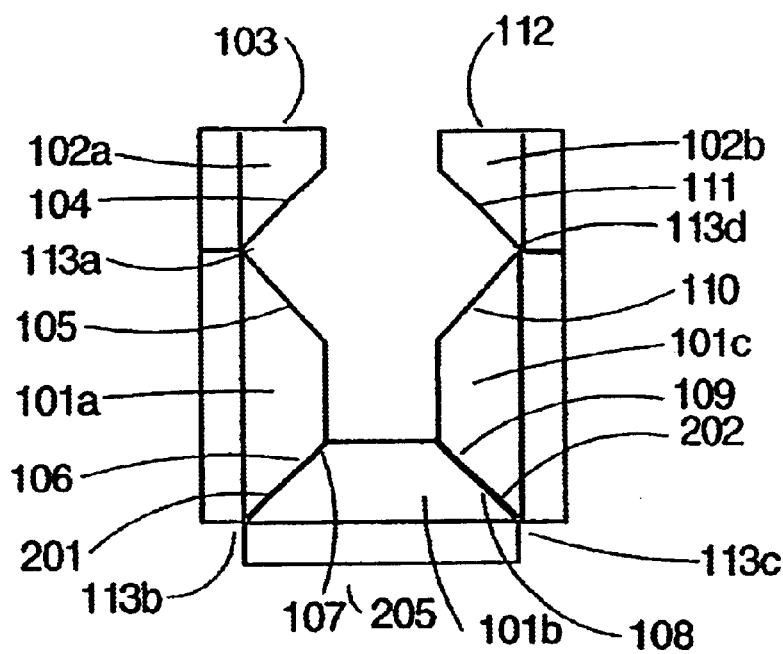
FIG. 2a is a window component profile in the rotational stage of the process of this invention.

FIG. 2a shows a window component profile in the rotational stage of the process of this invention. This view shows the window component of FIG. 1a, with the diagonal sloped portions 106, 107 and 108, 109 brought into contact and joined to form corners 201, 202 and thereby the bottom 205 of the window component.

Figure 2B:
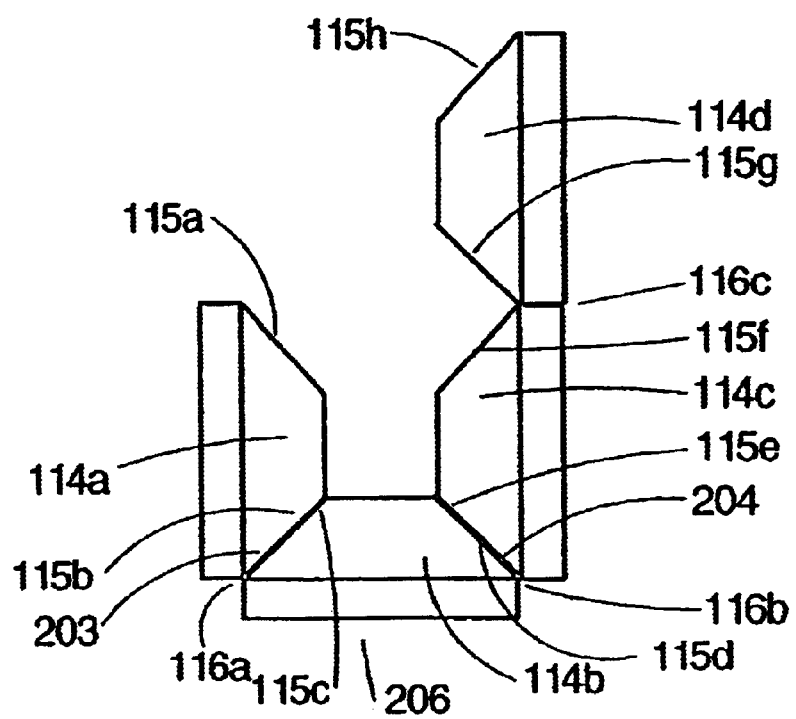
FIG. 2b is an alternative window component profile in the rotational stage of the process of this invention.

FIG. 2b shows an alternative window component profile in the rotational stage of the process of this invention. This view shows the window component of FIG. 1b, with the diagonal sloped portions 15b, 115c and 115d, 115e brought into contact and joined to form corners 203, 204 and thereby the bottom 206 of the window component.

FIG. 3a shows a completed window component in the final stage ready for installation of the window component of FIG. 1a. Ends 103 and 112 are connected forming a joint 301 at the top 309 of the window component. Diagonal sloped portions 104, 105 and 110, 111 are brought into contact and joined to form corners 302 and 303 and to define an interior 307 suitable for holding and retaining glass or other similar transparent or semi-transparent material. The joints 301, 311, 312, 313, 314 are typically and preferably made using adhesive, although alternatives such as bolts, screws, pins, clips and the like can be substituted without departing from the concept of this invention.

FIG. 3b shows a completed window component in the final stage ready for installation of the window component of FIG. 1b. Ends 117 and 118 are connected forming a joint 315 of the diagonal sloped portions 115a, 115h, thereby forming a corner 304. Diagonal sloped portions 115f, 115g are brought into contact and joined to form corner 305 and to define an interior 308 suitable for holding and retaining glass or other similar transparent or semi-transparent material. The joints 315, 316, 317, 318 are typically and prefer-ably made using adhesive, although alternatives such as bolts, screws, pins, clips and the like can be substituted without departing from the concept of this invention.

Figure 4:
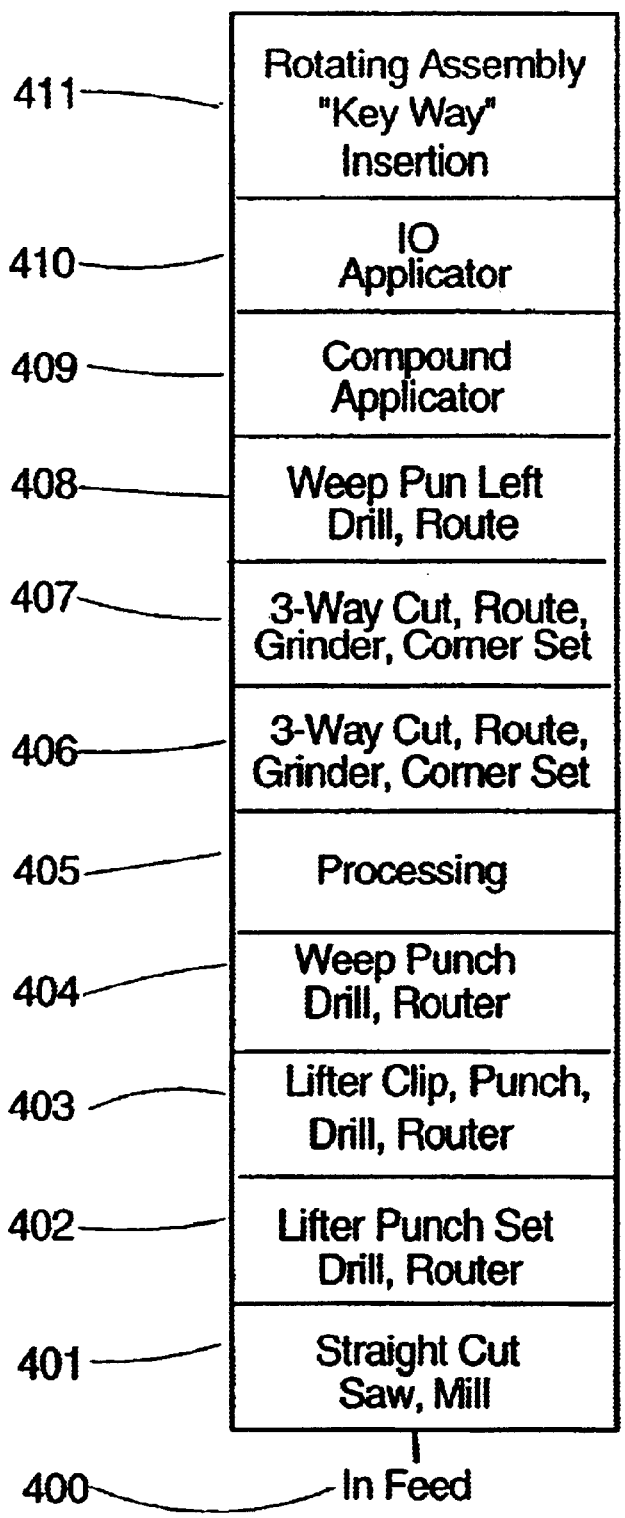
FIG. 4 is a process flow diagram of the preferred method of this invention.

FIG. 4 shows a process flow diagram of the preferred method of this invention. Initially, the material is fed 400 into the assembly process. Next, the material is straight cut 401 preferably by a saw or mill machine. The cut material is set 402 for Lifter or Balance Holding punch, preferably on a drill or router machine. The material is then punched 403 for the lifter clip, also preferably on a drill or router machine. Weep punching 404 is next performed on the material, again typically using a punch, drill or router machine. These punching steps are used to provide ventilation and drainage points in the window component. Miscellaneous processing 405 is performed to remove loose material and/or rough edges. A first three-way cut 405 is made, to produce diagonal portions, preferably using a cutter, grinder, or corner set. A second three-way cut 406 is made, to produce additional diagonal portions, also preferably using a cutter, grinder or corner set. A second weep punch 408 is made to further provide additional drainage and ventilation, preferably using a drill or router machine. A polymer compound is applied 409 to the joint regions thereby providing durable, flexible corners. Identification markings are applied 410 to permit control and tracking of window components. The assembly or window component is rotated with the corner and/or end portions joined together using adhesive, screws, bolts, clips, pins or the like forming the complete window component ready for the insertion of the transparent medium and for installation in the building structure.

The described embodiments of this invention are to be considered in all respects only as illustrative and not as restrictive. Although specific steps and window system components are illustrated and described, the invention is not to be limited thereto. The scope of this invention is, therefore, indicated by the claims. All changes, which come within the meaning and range of equivalency of, the claims are to be embraced as being within their scope.

I claim:

1. A method of manufacturing window components, comprising:
    (A) receiving material for processing;
    (B) cutting said received material to the desired length;
    (C) punching holes in said cut material for ventilation and routing;
    (D) removing loose materials and rough edges in said cut materials;
    (E) forming one or more diagonal portions and one or more connection portions by diagonally cutting said punched materials;
    (F) increasing the flexibility at said connection portion by applying a first polymer compound to said material;
    (G) folding said material to form a first window component corner; and
    (H) joining said window component corner thereby fixing a first and a second diagonal portion together at a joint region and forming a complete window assembly ready for insertion of a transparent medium and for installation in a building and structure
    (I) applying a second polymer compound to said joint region of said window component corner.

2. A method of manufacturing window components, as recited in claim 1, further comprising folding said material to form a second window component corner.

3. A method of manufacturing window components, as recited in claim 2, joining said window component corner thereby fixing a third and a fourth diagonal portion together.

4. A method of manufacturing window components, as recited in claim 1, further comprising folding said material to form a third window component corner.

5. A method of manufacturing window components, as recited in claim 4, joining said window component corner thereby fixing a fifth and a sixth diagonal portion together.

6. A method of manufacturing window components, as recited in claim 1, further comprising folding said material to form a fourth window component corner.

7. A method of manufacturing window components, as recited in claim 6, joining said window component corner thereby fixing a seventh and an eighth diagonal portion together.

8. A method of manufacturing window components, as recited in claim 1, further comprising joining a first end to a second end to define a window frame interior.

9. A method of manufacturing window components, as recited in claim 1, further comprising affixing an identification to said window material.

10. A method of manufacturing window components, as recited in claim 1, wherein said received material is a polymer based synthetic material.

11. A method of manufacturing window components, as recited in claim 1, wherein said received material is a metallurgy based material.

12. A method of manufacturing window components, as recited in claim 1, wherein said received material is an extruded material.

13. A method of manufacturing window components, as recited in claim 1, wherein said received material is an injection molded material.

14. A method of manufacturing window components, as recited in claim 1, wherein said received material is a wood material.

15. A method of manufacturing a window, comprising:
  (A) receiving material for processing;
  (B) cutting said received material to the desired length;
  (C) forming one or more diagonal portions and one or more connection portions by cutting portions in said received material;
  (D) applying a first polymer compound to said one or more connection portions of said received material to improve flexibility and durability at said one OR more connection portions;
  (E) forming said received material to form a first window component bend; and
  (F) joining said window component bend at a joint region thereby fixing a first and a second portion of said received material together and
  (G) applying a second polymer compound to said joint region of said window component bend.

16. A method of manufacturing a window system, comprising:
  (A) receiving material for processing;
  (B) cutting said received material to the desired length;
  (C) punching holes in said cut material for ventilation and routing;
  (D) forming one or more diagonal portions and one or more connection portions by cutting portions in said punched material;
  (E) removing loose materials from said punched material;
  (F) smoothing rough edges from said punched material;
  (G) applying a first polymer compound to said one or more connection portions of said punched material to improve flexibility and durability at said one or more connection portions;
  (H) forming said punched material to form a first window component bent shape to form a window component corner;
  (I) joining said window component corner thereby fixing a first and a second portion together into a joint region; and
  (J) completing an assembly of a window frame from a plurality of window component corners and
  (K) applying a second polymer compound to said joint region of said window component corner.

* * * * *